(12) United States Patent
Chiang et al.

(10) Patent No.: US 6,626,972 B2
(45) Date of Patent: Sep. 30, 2003

(54) SMOKE EXHAUSTER HAVING CHANGEABLE FILTER DEVICES

(76) Inventors: Chao Cheng Chiang, P.O. Box 63-99, Taichung (TW), 406; Chi Shyong Chiang, P.O. Box 63-99, Taichung (TW), 406

( * ) Notice: Subject to any disclaimer, the term of this patent is extended or adjusted under 35 U.S.C. 154(b) by 123 days.

(21) Appl. No.: 09/866,342

(22) Filed: May 25, 2001

(65) Prior Publication Data

US 2002/0174632 A1 Nov. 28, 2002

(51) Int. Cl.[7] .......................... B01D 46/10; B01D 50/00
(52) U.S. Cl. ...................... 55/418; 55/385.1; 55/473; 55/482; 55/505; 55/DIG. 36; 126/299 R; 126/299 D; 126/299 F; 454/62; 454/67
(58) Field of Search ................. 55/418, 410, 385.1, 55/385.2, 473, 482, 484, 490, 504, 507, 505, DIG. 18, DIG. 30, DIG. 36; 126/299 R, 299 D, 299 F; 454/62, 67

(56) References Cited

U.S. PATENT DOCUMENTS

| | | | | |
|---|---|---|---|---|
| 2,846,023 A | * | 8/1958 | Millman | 55/507 |
| 3,125,869 A | * | 3/1964 | Winton | 55/DIG. 36 |
| 3,800,689 A | * | 4/1974 | Brown | 55/DIG. 36 |
| 3,837,269 A | * | 9/1974 | Sweet et al. | 55/DIG. 36 |
| 4,083,362 A | * | 4/1978 | Bergmark et al. | 55/DIG. 36 |
| 4,088,123 A | * | 5/1978 | Bowen et al. | 55/DIG. 36 |
| 4,133,300 A | * | 1/1979 | Burton et al. | 55/DIG. 36 |
| 4,146,016 A | * | 3/1979 | Bowen et al. | 55/DIG. 36 |
| 4,252,547 A | * | 2/1981 | Johnson | 55/504 |
| 4,666,478 A | * | 5/1987 | Boissinot et al. | 126/299 D |
| 5,230,327 A | * | 7/1993 | Jang et al. | 126/299 D |
| 6,214,073 B1 | | 4/2001 | Chiang et al. | 55/385.1 |

* cited by examiner

Primary Examiner—Duane Smith
Assistant Examiner—Jason M. Greene

(57) ABSTRACT

A smoke exhauster includes a housing having a front opening and a rear orifice, for receiving two filter devices respectively. One or more fan devices are disposed in the housing for generating air to flow through filter devices, and a device may be used for selectively guiding the air to flow through either of the filter devices and includes one or more stop panels secured to the housing for blocking the air passages to the filter devices or includes a cover engaged onto the orifice of the housing for blocking the orifice of the housing.

6 Claims, 5 Drawing Sheets

US 6,626,972 B2

SMOKE EXHAUSTER HAVING CHANGEABLE FILTER DEVICES

BACKGROUND OF THE INVENTION

1. Field of the Invention

The present invention relates to a smoke exhauster, and more particularly to a smoke exhauster having two or more selective filter devices.

2. Description of the Prior Art

The present applicant has developed a typical smoke exhauster and issued as U.S. Pat. No. 6,214,073 to Chiang et al., which includes a filter device provided in the front portion of the smoke exhauster. However, the filter device may not be selectively shut off when required.

The present invention has arisen to mitigate and/or obviate the afore-described disadvantages of the conventional smoke exhausters.

SUMMARY OF THE INVENTION

The primary objective of the present invention is to provide a smoke exhauster including two or more filter devices that may be selectively shut off or actuated.

In accordance with one aspect of the invention, there is provided a smoke exhauster comprising a housing including a front portion having an opening formed therein, and including a rear and upper portion having an orifice formed therein, a first filter device for being disposed in the opening of the housing, a second filter device for being disposed in the orifice of the housing, fan means for generating air to flow through the first and the second filter devices, and means for selectively guiding the air to flow through either the first filter device or the second filter device.

The selectively guiding means includes at least one stop panel secured to the housing for blocking an air passage to the first filter device.

The housing includes a plate secured therein, the stop panel is secured to the plate of the housing. The housing includes a partition disposed therein and having a front portion, the plate is secured to the front portion of the partition. The partition is extended across the orifice of the housing.

The selectively guiding means includes a cover engaged onto the orifice of the housing for blocking the orifice of the housing.

A device is further provided for retaining the first filter device in the opening of the housing and includes at least one flange extended inward of the opening of the housing for engaging with and for retaining the first filter device in the opening of the housing.

A spring-biasing device is further provided for biasing the first filter device against the housing to retain the first filter device in the opening of the housing.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
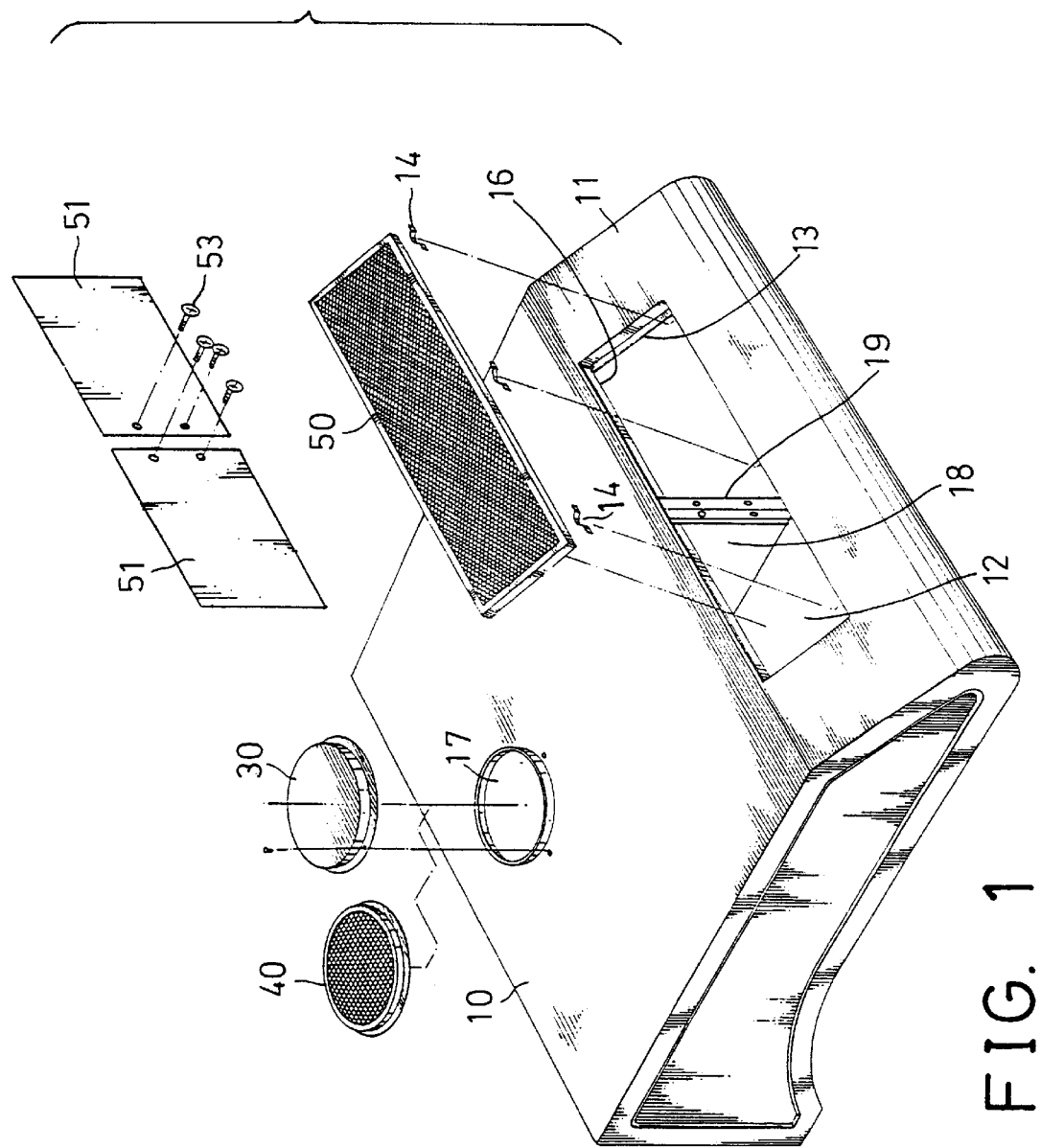
FIG. 1 is an exploded view of a smoke exhauster in accordance with the present invention.
Figure 2:
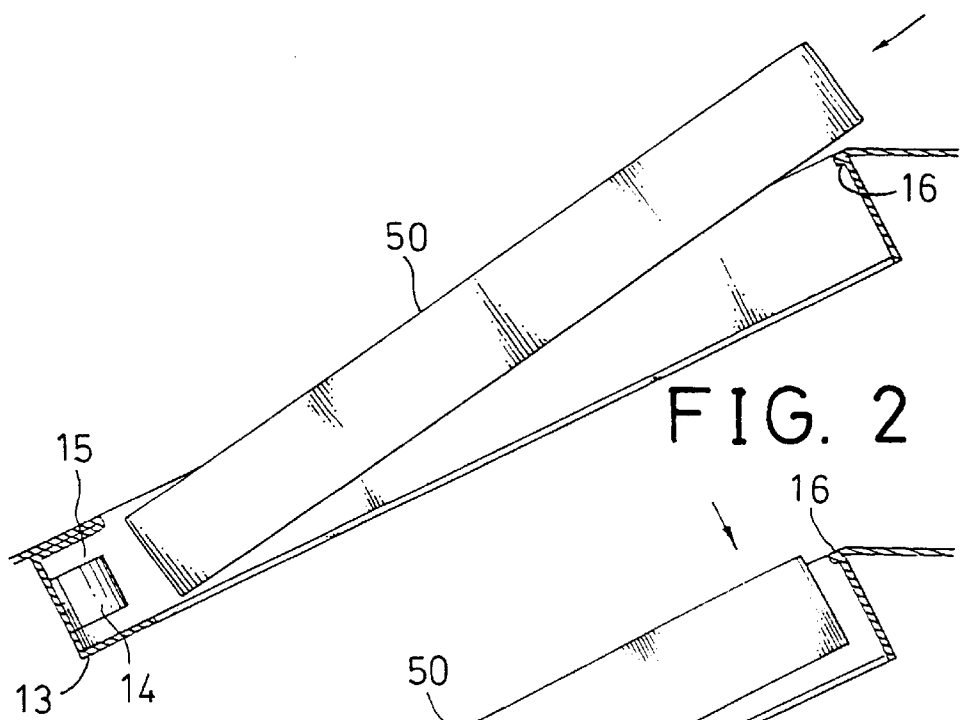
FIGS. 2, 3, 4 are partial cross sectional views illustrating the assembling of the filter device to the housing of the smoke exhauster.
Figure 3:
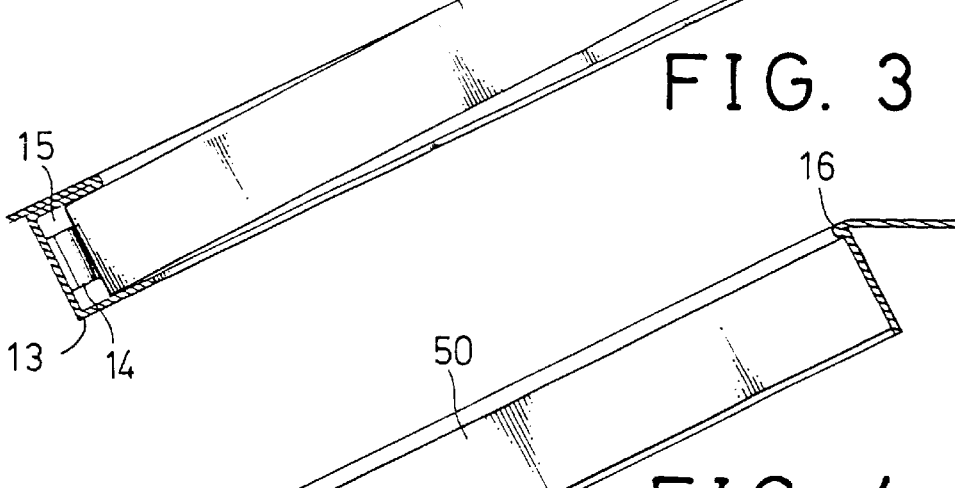
Figure 4:
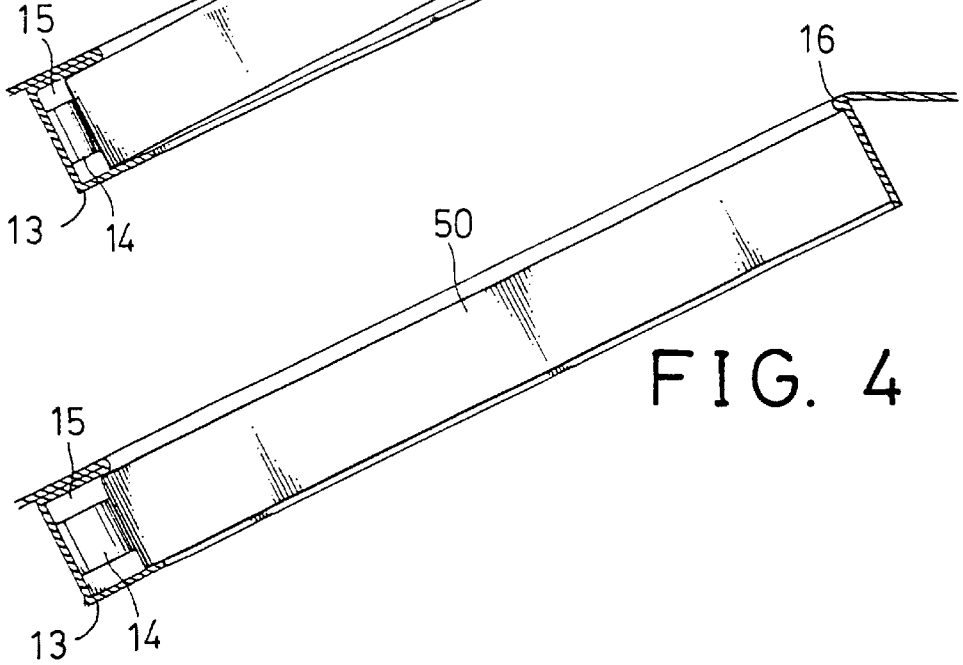

Referring to the drawings, and initially to FIGS. 1–6, a smoke exhauster in accordance with the present invention comprises a housing 10 including a front portion 11 having an opening 12 formed therein for receiving a filter device 50 therein, and including two or more flanges 13 extended inward of the opening 12 for solidly or stably supporting the filter device 50 within the opening 12 of the housing 10, and including one or more lock ears 16 for engaging with the filter device 50 and for further solidly or stably supporting the filter device 50 within the opening 12 of the housing 10. One or more spring members 14 may be engaged between the housing 10 and the filter device 50 for biasing and stably retaining the filter device 50 within the opening 12 of the housing 10, and for allowing the filter device 50 to be easily engaged into the opening 12 of the housing 10. As best shown in FIGS. 2–4, the housing 10 preferably includes a channel or a compartment 15 formed by the flanges 13 for stably retaining the spring members 14 within the compartment 15 of the housing 10.

Figure 5:
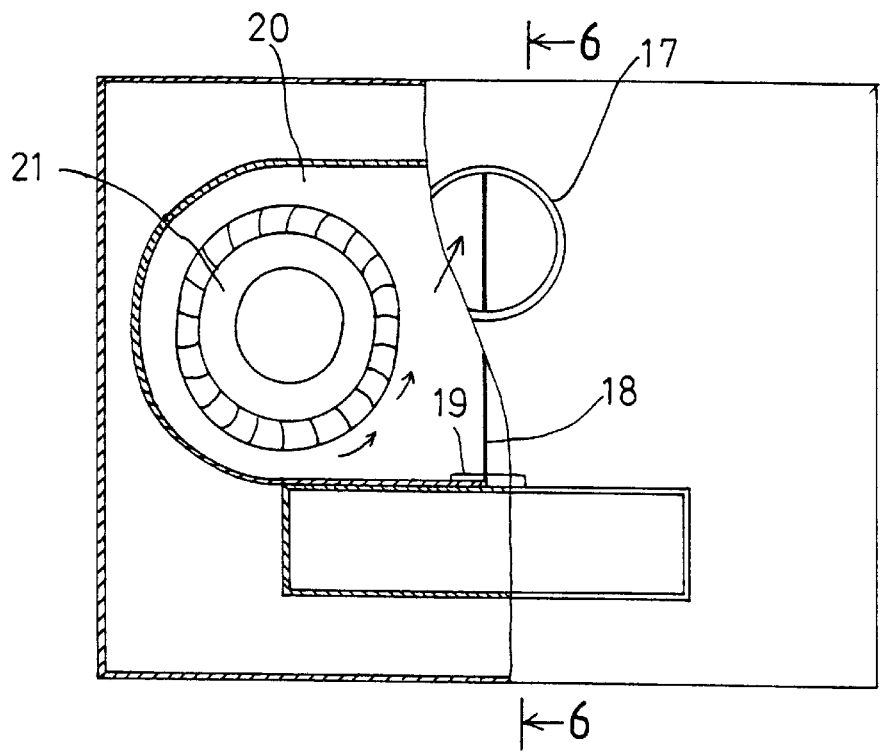
FIG. 5 is a top plane schematic view illustrating the operation of the smoke exhauster.
Figure 7:
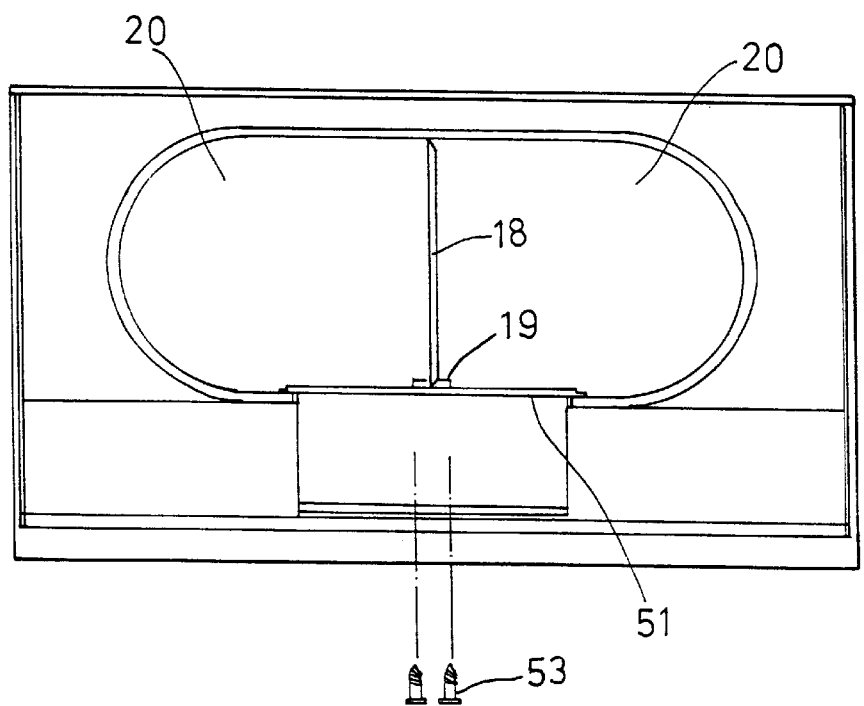
FIG. 7 is a top plane schematic view illustrating the assembling of one or more stop panels to the housing of the smoke exhauster.
Figure 6:
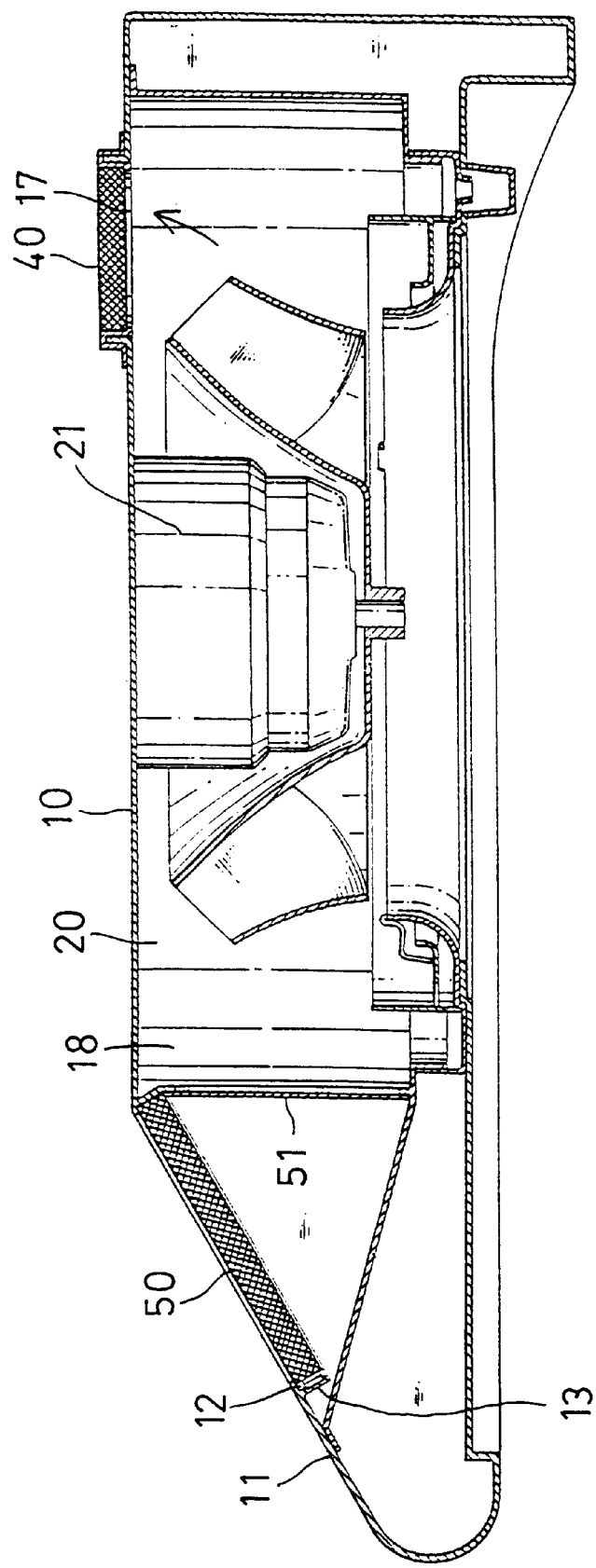
FIG. 6 is a cross sectional view taken along lines 6—6 of FIG. 5.

The housing 10 includes an orifice 17 formed in the rear and upper portion thereof. Another filter device 40 and a cover 30 may be selectively and/or detachably secured in the orifice 17 of the housing 10 with fasteners, or by a force-fitted engagement, or the like. A partition 18 is disposed in the middle portion of the housing 10 for separating the interior of the housing 10 into two chambers 20, and is extended across the orifice 17 of the housing 10. A fan device 21 may be disposed in each of the chambers 20. A plate 19 is secured to the front portion of the partition 18. As best shown in FIGS. 5–7, one or more stop panels 51 may be selectively and detachably secured to the front portion of the partition 18, or secured to the plate 19, or directly secured to the housing 10 with fasteners 53 or the like, for blocking the air passage to or through the front opening 12 of the housing 10, and for preventing the air or the smoke from flowing through the filter device 50.

Figure 8:
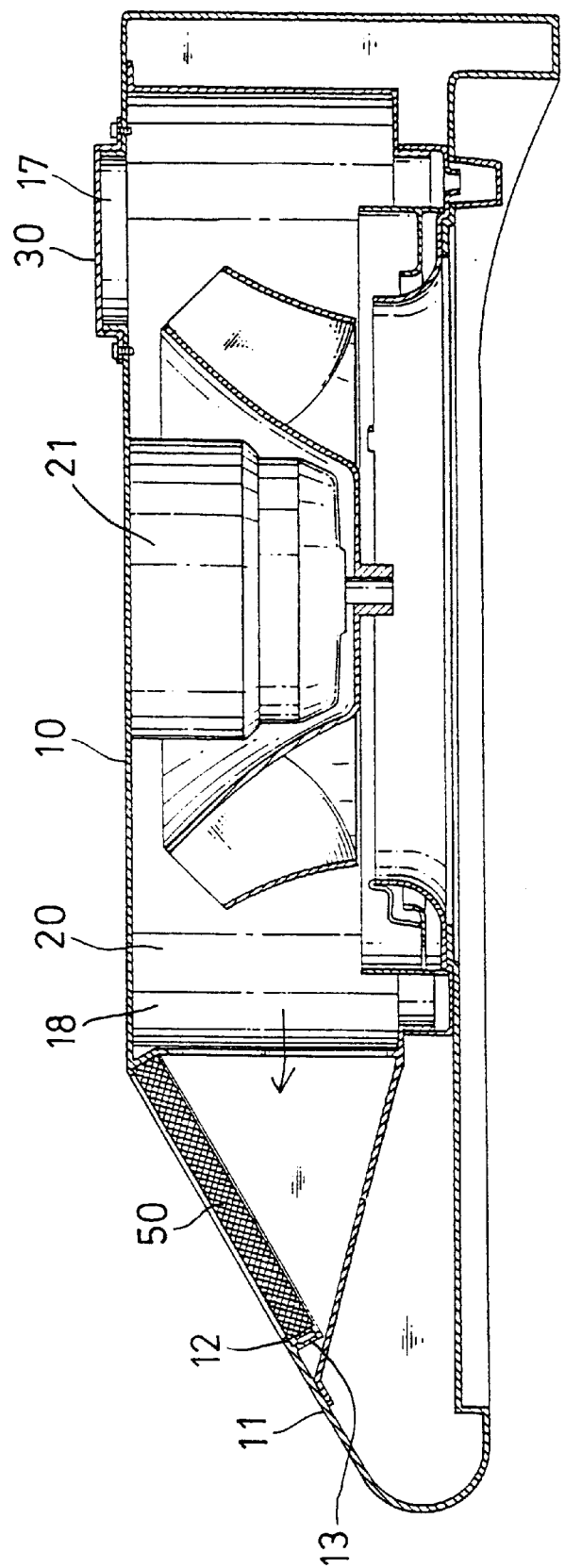
FIG. 8 is a cross sectional view similar to FIG. 6, illustrating the operation of the smoke exhauster.

Referring next to FIG. 8, when the stop panels 51 are detached or disengaged from the partition 18 or the housing 10, the air or the smoke may then flow out through the filter device 50.

In operation, as shown in FIG. 6, when the stop panels 51 are secured to the front portion of the partition 18 and when the cover 30 is removed from the orifice 17 of the housing 10, the air or the smoke generated by the fan device 21 may be caused to flow out through the filter device 40 that is disposed in the orifice 17 of the housing 10. When only one of the fan devices 21 is actuated, only one of the stop panels 51 may be selectively secured to the housing 10 for blocking the air passage from the actuated fan device 21 to the filter device 50. The smoke may thus be filtered by the filter device 40 and may flow upward through the filter device 40 and then may flow into the building, such as the kitchen.

As shown in FIG. 7, when the stop panels 51 are disengaged from the partition 18 or detached from the housing 10, and when the cover 30 is engaged onto the orifice 17 of the housing 10, the air or the smoke generated by the fan device 21 may be caused to flow out through the filter device 50 that is disposed in the opening 12 of the housing 10. The stop panels 51 may be selectively secured to the housing 10 for blocking the air passage from the actuated fan device(s) 21 to the filter device 50. The smoke may thus be filtered by the filter device 50 and may flow forward and outward through the filter device 50 and then may directly flow forward into the building, such as the kitchen. Alternatively or selectively, both the stop panels 51 and the cover 30 may be removed from the housing 10, for allowing the smoke generated by the fan devices 21 to flow out through both the filter devices 40, 50.

Accordingly, the smoke exhauster in accordance with the present invention includes two or more filter devices that may be selectively shut off or actuated.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A smoke exhauster comprising:

a housing including a front portion having an opening formed therein, and including a rear and upper portion having an orifice formed therein, a first filter device for being disposed in said opening of said housing, means for retaining said first filter device in said opening of said housing, spring means for biasing said first filter device against said housing to retain said first filter device in said opening of said housing, a second filter device for being disposed in said orifice of said housing, fan means for generating air to flow through said first and said second filter devices, and means for selectively guiding the air to flow through either said first filter device or said second filter device.

2. The smoke exhauster according to claim 1, wherein said selectively guiding means includes at least one stop panel secured to said housing for blocking an air passage to said first filter device.

3. The smoke exhauster according to claim 2, wherein said housing includes a plate secured therein, said at least one stop panel is secured to said plate of said housing.

4. The smoke exhauster according to claim 3, wherein said housing includes a partition disposed therein and having a front portion, said plate is secured to said front portion of said partition.

5. The smoke exhauster according to claim 4, wherein said partition is extended across said orifice of said housing.

6. The smoke exhauster according to claim 1, wherein said selectively guiding means includes a cover engaged onto said orifice of said housing for blocking said orifice of said housing.

* * * * *